(12) United States Patent
Parker et al.

(10) Patent No.: US 6,746,625 B2
(45) Date of Patent: Jun. 8, 2004

(54) SURFACE TREATED EMBOSSING CATALYST AND THE USE THEREOF

(75) Inventors: Anthony A. Parker, Newtown, PA (US); Thomas E. Janini, Trenton, NJ (US); Peter Rohrbacher, Bordentown, NJ (US)

(73) Assignee: Congoleum Corporation, Trenton, NJ (US)

( * ) Notice: Subject to any disclaimer, the term of this patent is extended or adjusted under 35 U.S.C. 154(b) by 73 days.

(21) Appl. No.: 10/152,492

(22) Filed: May 20, 2002

(65) Prior Publication Data

US 2003/0216247 A1 Nov. 20, 2003

(51) Int. Cl.$^7$ .............................. C08J 9/06; H01L 27/01
(52) U.S. Cl. ........................... 252/400.31; 252/400.52; 252/400.5; 521/91; 521/92; 521/76; 521/909
(58) Field of Search ............................. 521/91, 92, 76, 521/909; 252/400.31, 400.52, 400.5, 400.62

(56) References Cited

U.S. PATENT DOCUMENTS

| | | |
|---|---|---|
| 3,293,094 A | 12/1966 | Naim et al. |
| 3,989,667 A | 11/1976 | Lee et al. |
| 4,247,412 A | 1/1981 | Ohno et al. |
| 4,384,048 A | 5/1983 | Bathgate |
| 4,655,962 A | 4/1987 | Rowland et al. |
| 4,847,159 A | 7/1989 | Glajch et al. |
| 5,336,693 A | 8/1994 | Frisch |
| 5,348,760 A | 9/1994 | Parker et al. |
| 5,531,944 A | 7/1996 | Frisch |
| 5,712,018 A | 1/1998 | Frisch |
| 5,728,332 A | 3/1998 | Frisch et al. |
| 5,733,630 A | 3/1998 | Frisch et al. |

*Primary Examiner*—Morton Foelak
(74) *Attorney, Agent, or Firm*—Morgan, Lewis & Bockius LLP (57) ABSTRACT

The present invention relates to a new class of blowing inhibitors and a method for discovering such inhibitors with determinable inhibition activities. The new class of blowing inhibitors are organo-silanes that may be directly adsorbed onto active catalytic sites of blowing catalysts and that can inhibit the thermo-catalytic efficiency of such catalysts.

8 Claims, 5 Drawing Sheets

SURFACE TREATED EMBOSSING CATALYST AND THE USE THEREOF

BACKGROUND OF THE INVENTION

1. Field of the Invention

The present invention generally relates to blowing agent modifiers and their use. More specifically, the present invention is directed to blowing inhibitors and accelerators used to control chemical embossing of various coverings.

2. Description of Related Art

Chemical embossing has been used to create textured surface coverings for over 35 years and is well known in the art. The process of chemical embossing is described in U.S. Pat. No. 3,293,094 issued Dec. 20, 1966 (the "Nairn patent") and is herein incorporated by reference in its entirety. The Nairn patent discloses a process wherein a resinous composition (also referred to as a foamable polymer) containing a blowing agent mixed with a catalyst is deposited on a backing layer. The resinous layer is gelled at a temperature below the decomposition temperature of the blowing agent. An ink layer is deposited onto the gelled resinous layer by conventional printing or transfer methods. The resinous layer and ink layer form a chemical embossing layer. An optional wear layer may be deposited over the ink layer.

The ink layer includes regions containing a modifier that partially covers the resinous layer in a repeating or random pattern according to the desired design. The modifier diffuses into the gelled resinous layer directly below the modifier. The layers are then heat treated at a temperature sufficient to fuse the resinous layer and to decompose the blowing agent in the regions permeated by the modifier. The decomposition of the blowing agent creates gas pockets or bubbles in the foamable polymer that increase the thickness of the resinous layer in the permeated regions. The regions unaffected by the modifier do not expand as much as the permeated regions resulting in a textured surface containing expanded and substantially unexpanded regions in a pattern corresponding to the modifier pattern in the ink layer.

Figure 1:
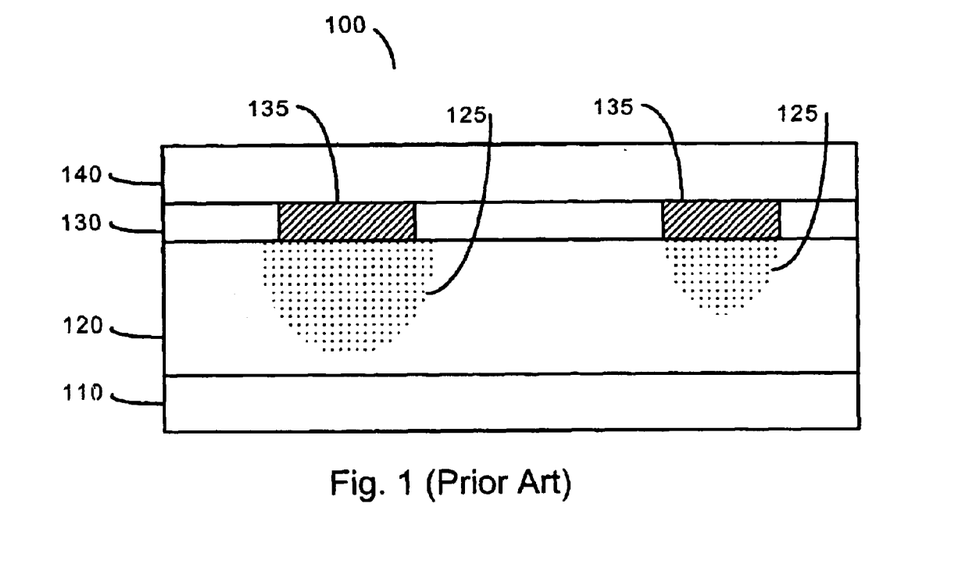
FIG. 1 is a cross-sectional schematic diagram of a surface covering prior to decomposition of the blowing agent.

FIG. 1 is a cross-sectional schematic diagram of a surface covering described by Nairn prior to decomposition of the blowing agent. The surface covering 100 comprises a base layer 120 sandwiched between a backing layer 110 and an ink layer 130. An optional wear layer 140 covers the ink layer 130 and provides for increased wear and stain resistance for the surface covering 100. The base layer 120 comprises a resinous composition and a blowing agent. The ink layer 130 includes regions 135 containing a modifier that diffuses into the base layer 120 creating permeated regions 125 in the base layer 120.

Figure 2:
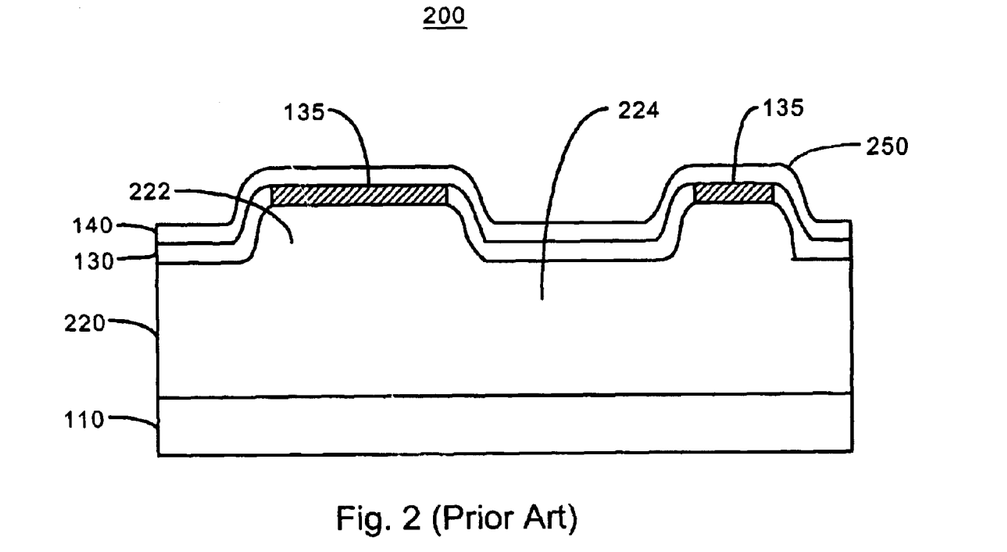
FIG. 2 is a cross-sectional schematic diagram of a surface covering after decomposition of the blowing agent.

FIG. 2 is a cross-sectional schematic diagram of a surface covering 200 described by Nairn after decomposition of the blowing agent has produced expanded regions 222 in the surface covering. The expanded regions 222 correspond to the permeated regions 125 of the un-expanded surface covering and are in register with the portions 135 of the ink layer 130 containing the modifier. As a result, the expanded surface covering 200 has a textured surface 250 arising from the variation in the base layer thickness between expanded regions 222 and un-expanded regions 224 of the base layer 220.

The selection of components comprising the embossing composition containing the modifier depends inter alia on the compositions of the blowing agent and the base layer resin composition. The Nairn patent discloses a simple test wherein candidate embossing compositions are deposited on a gelled base layer followed by heat treatment sufficient to fuse the base layer and decompose the blowing agent.

One blowing agent described by Nairn is azodicarbonamide. Azodicarbonamide decomposes between about 195–205° C. The decomposition temperature may be lowered by adding a catalyst to the blowing agent. An example of a catalyst is ZnO.

Improved embossing compositions are disclosed in U.S. Pat. Nos. 5,336,693 issued Aug. 9, 1994, 5,531,944 issued Jul. 2, 1996, and 5,712,018 issued Jan. 27, 1998 (collectively referred to as the "Frisch patents") and are herein incorporated by reference in their entirety. The Frisch patents disclose an embossing composition comprising an aqueous suspension wherein the modifier is uniformly dispersed in the suspension as a substantially insoluble particulate solid.

U.S. Pat. Nos. 5,728,332 issued Mar. 17, 1998 and 5,733,630 issued Mar. 31, 1998 (collectively referred to as the "Frisch et al. patents") disclose an embossing composition incorporating modifiers that suppress the decomposition of the blowing agent and modifiers that accelerate the decomposition of the blowing agent and are herein incorporated by reference in their entirety.

The interaction between the blowing agent and modifier is sufficiently complex that empirical tests such as the test described by Nairn must be used to screen and confirm the effectiveness of the ink compositions. Such tests, however, cannot provide information relating to the mechanism by which the modifier affects the decomposition of the blowing agent nor whether the modifier acts directly on the blowing agent or on the accelerator. Although there are numerous compositions developed through empirical testing that are adequate for the manufacture of textured surface coatings, there still exists a need for compositions that allow for more accurate and precise control of the texturing process.

SUMMARY OF THE INVENTION

Accordingly, it is an object of the present invention to provide a new class of modifiers capable of inhibiting the activity of the catalyst and to provide a method for discovering such modifiers with determinable modifying characteristics.

One embodiment of the present invention is directed to a modifier for controlling decomposition of a blowing agent, the blowing agent characterized by a decomposition temperature, the modifier comprising a catalyst having an effective capability to reduce the blowing agent decomposition temperature and an organo-silane adsorbed onto the catalyst, the organo-silane capable of inhibiting the effectiveness of the catalyst.

Another embodiment of the present invention is directed to a gel layer for forming a chemical embossing layer of a multi-layer covering comprising: at least one foamable polymer; a blowing agent characterized by a decomposition temperature, the blowing agent capable of evolving gas and forming a plurality of bubbles in the foamable polymer during decomposition thereof; a catalyst capable of reducing the decomposition temperature of the blowing agent; and an organo-silane capable of modifying the capability of the catalyst to reduce the decomposition temperature of the blowing agent.

Another embodiment of the present invention is directed to a method for controlling decomposition of a blowing agent catalyzed by a catalyst, the blowing agent and catalyst mixed in a foamable polymer of a chemical embossing layer, the method comprising the steps of modifying the catalyst with an organo-silane and heating the chemical embossing layer, whereby the organo-silane regulates the decomposition of the blowing agent by the catalyst.

Another embodiment of the present invention is directed to a method of identifying a modifier for controlling activity of a catalyst for decomposition of a blowing agent, the method comprising the steps of: adsorbing a test compound onto the catalyst; measuring a decomposition temperature of the blowing agent heated in contact with the catalyst; and identifying the test compound as a modifier based on the measured decomposition temperature.

These above objects as well as other objects and features of the present invention will appear from the following description in which the preferred embodiments are set forth in detail in conjunction with the accompanying drawings.

DETAILED DESCRIPTION OF THE PREFERRED EMBODIMENTS

The structure and function of the preferred embodiments of the present invention can best be understood by reference to the foregoing drawings and following description. The reader will note that the same reference designations appear in multiple locations. Where this is the case, the numerals refer to the same or corresponding structure in those locations.

The inventors of the present invention have discovered that modifiers may be classified into two categories: modifiers that affect blowing agent decomposition by surface absorption onto the catalyst; and modifiers that affect blowing agent decomposition by mechanisms other than surface absorption onto the catalyst.

The candidate modifier adsorbed onto the catalyst may inhibit or accelerate the catalyst or may no have an effect on the decomposition temperature of the blowing agent. An inhibitor is commonly referred to as a compound or composition that, when mixed with the blowing agent (the mixture of blowing agent and catalyst) modifies the decomposition temperature to a range between the pure azodicarbonamide decomposition temperature and the decomposition temperature of the azodicarbonamide/catalyst mixture. An accelerator is commonly referred to as a compound or composition that, when mixed with the blowing agent (the mixture of blowing agent and catalyst) lowers the decomposition temperature to a temperature less than the decomposition temperature of the azodicarbonamide/catalyst mixture. A modifier, as used herein, refers to compositions that affect the decomposition temperature of the blowing agent and includes both inhibitors and accelerators.

The present invention provides for a quantitative ranking of the effectiveness of candidate modifiers in contrast to the simple categorization (the modifier is effective or is not effective) of the Nairn test. Moreover, the measured decomposition temperature may be used to determine the appropriate process temperatures for the chemical embossing process. The relative simplicity of the present invention also allows for rapid screening of candidate modifiers.

In particular, a method for identifying such modifiers and their mechanism has been developed. In one embodiment of the present invention, a candidate modifier is mixed with the catalyst as a solution (if both catalyst and candidate modifier are soluble in the solvent) or a suspension (if either the catalyst or candidate modifier remains as a particulate in the solution). In a preferred embodiment, the catalyst is ZnO particles having a median particle size less than 1000 nm and more preferably less than 250 nm. The solvent is removed using any of the techniques known to one of skill in the art, such as drying at room temperature or at 100° C.

The dried sample may be analyzed using diffuse reflectance infra-red spectroscopy (DRIFT) as known to one of skill in the art. DRIFT analysis may indicate whether the candidate modifier has adsorbed onto the surface of the catalyst as indicated by the presence of a C—H bond stretching mode commonly associated with surface adsorption of an organic molecule in the infra-red region of the electromagnetic spectrum. The presence of such a bond stretching mode may indicate that the modifier has adsorbed onto the catalyst and may be capable of acting as a modifier to the catalytic properties of the catalyst.

In one embodiment for further evaluating the catalyst and modifier, the dried sample is mixed with the blowing agent as known to one of skill in the art. In another embodiment, the dried sample is mixed with a blowing agent and a plasticizer such as, for example, di-isononyl-phthalate. In a preferred embodiment, the blowing agent is azodicarbonamide. Azodicarbonamide decomposes between about 195–205° C. When ZnO is mixed with azodicarbonamide, the decomposition temperature of the mixture may be lowered by 10–25° C.

The decomposition temperature of the dried sample/blowing agent mixture is determined by thermogravimetric analysis (TGA). As known to one of skill in the art, TGA monitors the mass of a sample while the sample is heated. When the blowing agent begins decomposition, the mass of the sample will decrease. The temperature where the sample mass rapidly decreases is referred to as the decomposition temperature of the sample. If the candidate modifier is ineffective, the measured decomposition temperature of the sample should be close to the decomposition temperature of the blowing agent/catalyst mixture. If the candidate modifier acts as an inhibitor, the measured decomposition temperature will be higher than the blowing agent/catalyst mixture but less than the decomposition temperature of the pure blowing agent without the catalyst.

A new class of modifiers have been discovered by the inventors using an embodiment of the present invention. The inventors have found that organo-silanes are effective inhibitors. Typical examples of organo-silane structures are:

where $R_1$ and $R_3$ are aliphatic residues or a functionalized organic substituent and $R_2$ is an aliphatic residue. More particularly, the functionalized organic substituent of $R_1$ and $R_3$ may be an aliphatic group, an aromatic group, a polar group, a non-polar group, a vinyl group, an acrylic group, an amino group, a styryl-amino group, a mercapto group, or a phenyl-amino group. The aliphatic residue of $R_2$ may be a sec-butyl group, a n-butyl group, an isopropyl group, a n-propyl group, an ethyl group, a pentyl group, a hexyl group, a heptyl group, an octyl group, a nonyl group, a decyl group, an isomer of any of such groups, a high molecular weight residue of any of such groups, or a mixture thereof. In addition, the aliphatic residue of $R_1$, $R_2$, and $R_3$ may also be any common linear or branched aliphatic residues. $R_1$ and $R_3$ of the foregoing organo-silanes may also be the same aliphatic residue. The organo-silanes may be neat (not hydrolyzed), partially or completely hydrolyzed. In an alternate embodiment, the organo-silane may be oligomerized.

In one embodiment of the present invention, the organo-silane is N-(beta aminoethyl)-gamma-aminopropyltrimethoxysilane available as Z6020P from Dow Corning of Midland, Mich. In another embodiment, the organo-silane is a methacrylate functional silane coupling agent available as Z6030P from Dow Corning of Midland, Mich. Both Z6020P and Z6030P are solutions of partially hydrolyzed organo-silanes.

When the catalyst is pre-treated with either of the above-mentioned organo-silanes, the decomposition temperature of a blowing agent mixture containing the pre-treated catalyst is higher than the decomposition temperature of a blowing agent mixture containing the un-treated catalyst, indicating the effectiveness of the organo-silanes as modifiers for chemical embossing layers. Neither of the above-mentioned organo-silanes, however, exhibit any effectiveness as a modifier when characterized by the Nairn test. One skilled in the art following the Nairn test would presumably exclude both of the above-mentioned organo-silanes from further investigation as a modifier.

In a preferred embodiment, the organo-silane is n-octyltriethoxy silane. In contrast to Z6020P and Z6030P, adsorption onto the catalyst prior to incorporation of the catalyst into the gel layer is not required for n-octyltriethoxy silane. Instead, n-octyltriethoxy silane may be applied with the ink layer and allowed to diffuse into the gel layer. When used in its unhydrolyzed state, n-octyltriethoxy silane acts as an inhibitor. When prehydrolyzed, however, n-octyltriethoxy silane acts as an accelerator.

The invention having been described, the following examples are presented to illustrate, rather than to limit the scope of the invention. Examples 1 through 3 illustrate the modifiers and methods for characterizing the effectiveness of the modifiers according to the present invention.

EXAMPLE 1

Surface Treated Powder Catalysts

Adsorbent solutions were prepared by mixing or dissolving a test compound (or "adsorbent") in HPLC-grade ethanol available from Aldrich Chemical Company, Inc. of Milwaukee, Wis. Table 1 summarizes the five adsorbent solutions used in this Example. The five adsorbent solutions included: one control solution of ethanol; two solutions, each containing a known modifier; and two solutions, each containing a previously unknown modifier. The two known modifiers are fumaric acid and tolyltriazole. The tolyltriazole (TT100) is a mixture of 4- and 5-methyl isomers of methylbenzotriazole and is available from PMC Specialties Group, Inc. of Westlake, Ohio. The two previously unknown modifiers are pre-hydrolyzed organo-silane mixtures available from Dow Corning of Midland, Mich. The solution designated Z6020P in Table 1 is a 50:50:5 solution of Z6020 pre-hydrolyzed organo-silane, methanol, and water, respectively. Z6020 is a diaminofunctional silane, N-(beta aminoethyl)-gamma-aminopropyltrimethoxysilane, normally used as a coupling agent. The solution designated Z6030P in Table 1 is a 50:50:5:1 solution of Z6030 pre-hydrolyzed organo-silane, methanol, water, and acetic acid, respectively. Z6030 is a methacrylate functional silane coupling agent.

TABLE 1

Adsorbents Concentrations in Adsorbent Slurries

| Test Adsorbent | g per 100 g of Ethanol | $\mu$moles |
|---|---|---|
| TT100 tolyltriazole mixture | 0.6 | 4511 |
| Z6020P | 0.3 | 1666 |
| Z6030P | 0.3 | 1456 |
| Fumaric Acid | 0.3 | 2586 |
| Control (with no adsorbent) | — | — |

ZnO powder was mixed into each adsorbent solution at a ZnO-to-solution weight ratio of 30:70 for all test adsorbents. The ZnO powder was Kadox 911™, available from Zinc Corp. of America of Monaca, Pa. and had a median particle size of 0.12 um. The ZnO slurries were mixed in wide mouth jars by a magnetic stirrer for 24 hours. After the mixing, the ZnO slurries were allowed to settle for a pre-determined period of time, for example, until clear supernatants formed in all of the test samples. The supernatants were pipetted from the jars and retained for analysis by gas chromatography. Fresh ethanol was added to the ZnO sediment in each jar. The samples were re-agitated and allowed to settle for a pre-selected period of time. The re-agitation and washing processes were repeated a total of five times in an attempt to remove all but the most strongly chemisorbed species (i.e., chemical adsorption) from the mixtures. After the final washing, the ZnO powders were dried in air in open jars in a hood for approximately one month. A portion of each treated ZnO powder was separately "dried" in a forced air oven at about 100° C. for 3 hours.

Figure 3A:
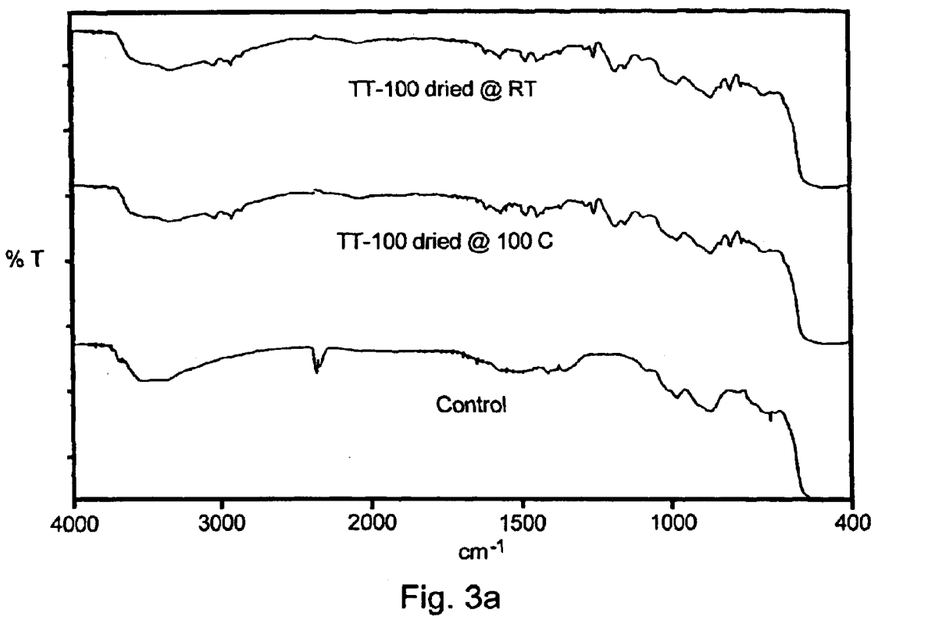
FIG. 3A shows spectra from diffuse reflectance infrared spectroscopy (DRIFT) of ZnO powder with and without TT100 surface treatment.
Figure 3B:
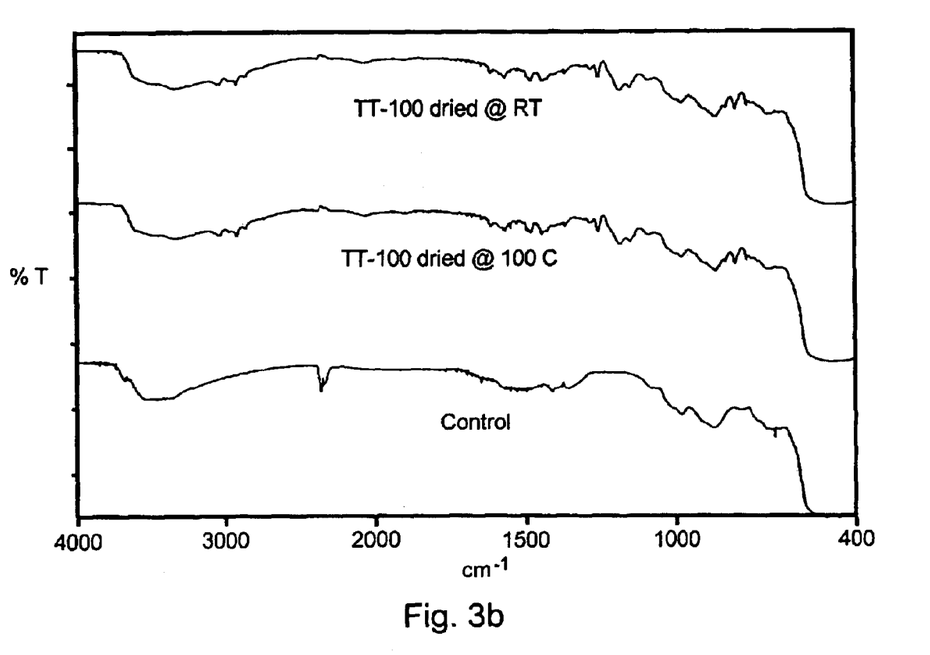
FIG. 3B shows DRIFT spectra of ZnO powder with and without Z6030P treatment.
Figure 3C:
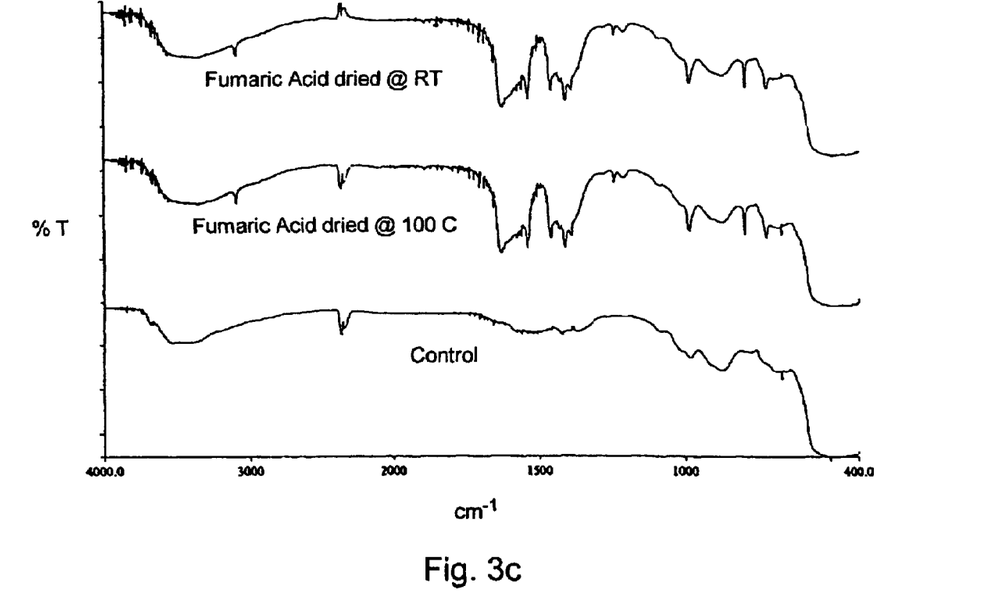
FIG. 3C shows DRIFT spectra of ZnO powder with and without fumaric acid treatment.
Figure 3D:
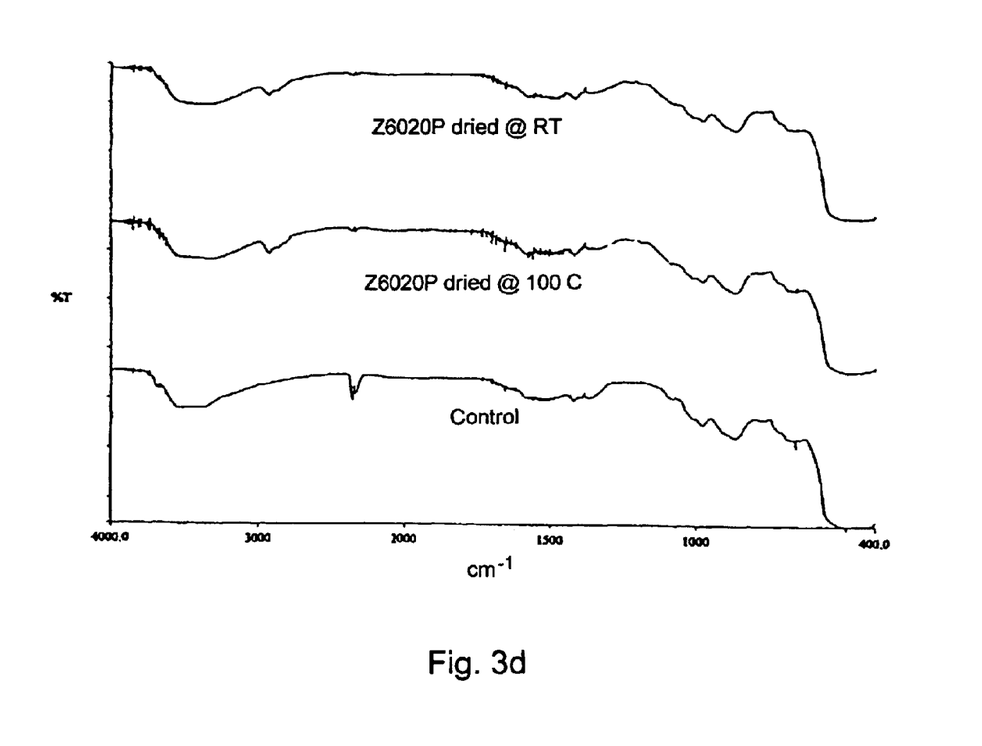
FIG. 3D shows DRIFT spectra of ZnO powder with and without Z6020P treatment.
Figure 3E:
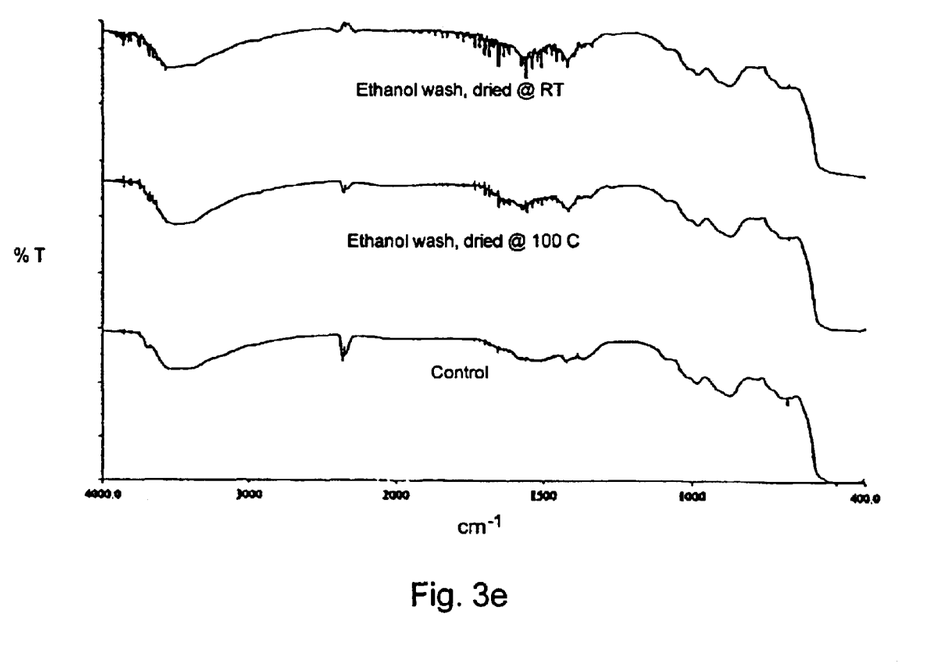
FIG. 3E shows DRIFT spectra of ZnO powder before and after ethanol washing.
Figure 3F:
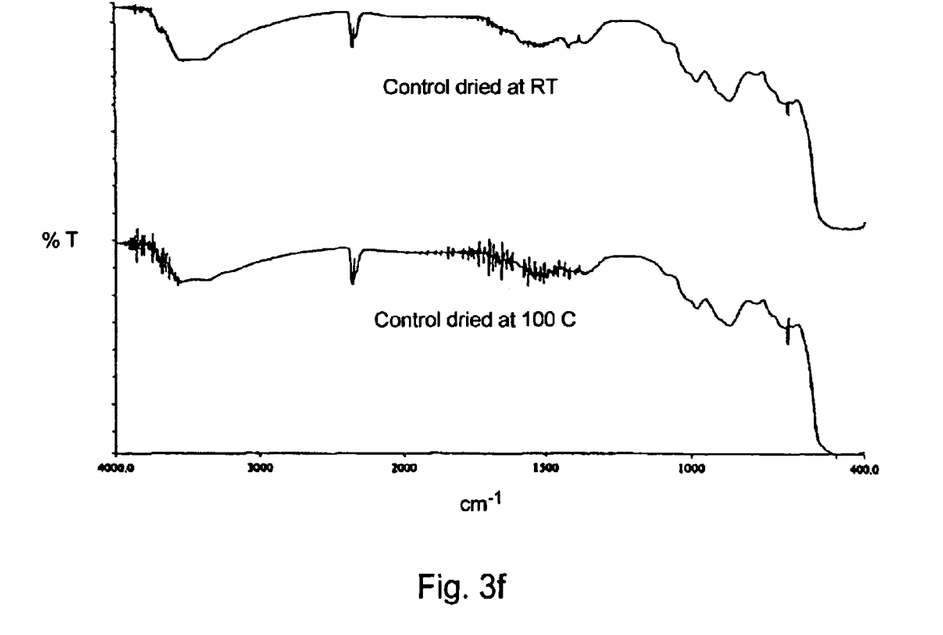
FIG. 3F shows DRIFT spectra of ZnO powder as-received and after drying at 100° C.

Both oven-dried and ambient-dried powders were analyzed for organic surface coverage by diffuse reflectance infrared spectroscopy (DRIFT). FIG. 3A shows the DRIFT spectra of ZnO powder mixed in the TT100 solution and powder that was dried in the as-received condition. The aliphatic C—H bond stretching is evident in the TT100 DRIFT spectra but is absent in the control spectra, indicating adsorbed TT100 on the ZnO powder. FIG. 3B shows the DRIFT spectra of ZnO powder mixed in the Z6030P solution and powder that was dried in the as-received condition. The aliphatic C—H bond stretching is evident in the Z6030P spectra, indicating adsorbed Z6030 on the ZnO powder. FIG. 3C shows the DRIFT spectra of ZnO powder mixed in the fumaric acid solution and powder that was dried in the as-received condition. The aliphatic C—H bond stretching is evident in the fumaric acid spectra, indicating adsorbed fumaric acid on the ZnO powder. FIG. 3D shows the DRIFT spectra of ZnO powder mixed in the Z6020P solution and powder that was dried in the as-received condition. The aliphatic C—H bond stretching is evident in the Z6020P spectra, indicating adsorbed Z6020 on the ZnO powder. FIG. 3E shows the DRIFT spectra of ZnO powder mixed in the control solution and powder that was dried in the as-received condition. FIG. 3F shows the DRIFT spectra of the as-received ZnO powder dried at room temperature and at 100° C. The spectra in FIGS. 3E and 3F show no evidence of organic infrared (IR) absorption peaks.

The treated ZnO powders were slurried in di-isononyl-phthalate plasticizer (DINP), available from Aldrich Chemical Co., Milwaukee, Wis., together with a blowing agent such as, for example, azodicarbonamide powder (such as Celogen AZ 3001 available from Uniroyal Chemical Co., Middlebury, Conn.) at a ratio of 1.2 g ZnO:1.5 g azodicarbonamide:7.3 g DINP. The slurries were stirred by hand and allowed to set in an ultrasound bath for 2 hours to insure uniform dispersion. Thermogravimetric analysis (TGA) under a 20° C./min heating rate and a 50 cc/min air purge was performed on each of the slurries.

Figure 4:
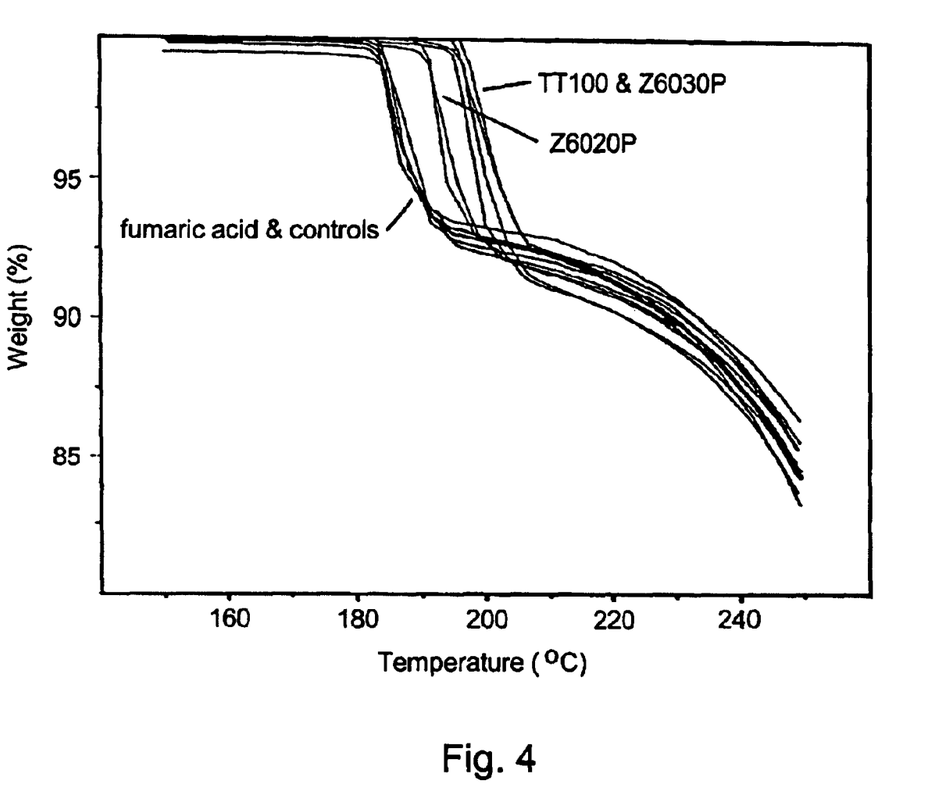
FIG. 4 shows a thermogravimetric analysis (TGA) plot of treated ZnO powders mixed with azodicarbonamide in di-isononyl-phthalate plasticizer according to the present invention.

FIG. 4 shows the TGA of the treated ZnO powders slurried with azodicarbonamide blowing agent in DINP plasticizer according to the present invention. As shown in the FIG. 4, the decomposition of the azodicarbonamide blowing agent is readily visible in all of the TGA profiles as a sudden autocatalytic weight loss. The onset of the decomposition temperature ranged from about 170° C. to 230° C. depending on the absorbent.

Table 2 summarizes drying conditions and experimentally observed decomposition temperature of azodicarbonamide in the presence of the treated ZnO powders.

TABLE 2

Effects of Adsorbent-Treatment of ZnO Powder Catalyst on Blowing Agent Decomposition Temperature

| | Onset of Decomposition (° C.) | |
|---|---|---|
| Adsorbent | Dried at ambient | Dried at 100° C. |
| TT100 | 197 | 196 |
| Z6030P | 196 | 197 |
| fumaric acid | 184 | 183 |
| Z6020P | 190 | 189 |
| control: ethanol | 183 | 182 |
| control: as received | — | 183 |

Table 2 indicates a decomposition temperature dependence on the absorbent type. Drying conditions, however, showed no significant effect on the decomposition temperature. The control (no absorbent) powder exhibited the lowest decomposition temperature indicating the efficiency of the pure ZnO powder as an accelerator for the azodicarbonamide blowing agent. The Z6020 and Z6030 prehydrolyzed organo-silanes modified or "inhibited" the action of the ZnO accelerator as reflected by the higher decomposition temperatures of the Z6020 and Z6030 absorbents. Furthermore, the Z6030 absorbent appears to be a more efficient inhibitor than the Z6020 absorbent as indicated by the higher decomposition temperature of Z6030-treated powder relative to the decomposition temperature of the Z6020-treated powder. The Z6030 absorbent inhibited the decomposition of the blowing agent until 196° C. and appeared to be as efficient as the known inhibitor TT100.

The difference between the TT100 decomposition temperature of 196° C. and the fumaric acid decomposition temperature of 184° C. strongly suggests a different inhibitor mechanism for the two known inhibitors. Absorption of the TT100 directly onto the ZnO accelerator appears to inhibit the action of the accelerator and thereby raise the decomposition temperature of the blowing agent to 196° C. Absorption of fumaric acid onto the ZnO accelerator, however, does not appear to appreciably increase the decomposition temperature. Therefore, the present invention is capable of distinguishing inhibitors that operate via absorption onto the accelerator surface from inhibitors that operate via a different mechanism.

The ability of the present invention to screen for candidate inhibitors is demonstrated by the Z6030 and Z6020 prehydrolyzed organo-silanes. Neither absorbent is known in the prior art as a blowing agent inhibitor. Table 2 indicates that both Z6030 and Z6020 absorbents act as blowing agent inhibitors. Furthermore, the present invention is capable of providing a quantitative ranking of the effectiveness of the absorbent as reflected by the different decomposition temperatures of the absorbents.

EXAMPLE 2

Evaluation Of Test Absorbents

The effectiveness of the test absorbents was evaluated using the test described by Nairn wherein candidate inhibitors were printed or painted onto a gelled plastisol containing a blowing agent. The painted plastisol was heated to fuse the plastisol and decompose the blowing agent.

Approximately 1 ml of a concentrated (approximately 50% active compound) Z6020P solution was placed onto a gelled layer of PVC plastisol containing azodicarbonamide and ZnO. Similarly, approximately 1 ml of a concentrated (approximately 50% active compound) Z6030P solution was placed onto a gelled layer of PVC plastisol containing azodicarbonamide and ZnO. Approximately 1 g of TT100, a solid powder having a melting temperature of about 80° C., was placed onto a gelled layer of PVC plastisol containing azodicarbonamide and ZnO. The samples were placed in an oven with an observation port and were heated to 400° F. for about 2 minutes.

The TT100 melted and expansion (foaming) of the gelled layer was inhibited in the area immediately underneath the melted TT100. The results for the TT100 sample are consistent with the known inhibition properties of TT100 and confirm the effectiveness of the Nairn test for inhibitors.

The Z6020 and Z6030 samples, on the other hand, did not inhibit the expansion of the gelled plastisol layer.

In a second experiment, solutions containing 0.6 g absorbent per 100 ml ethanol were prepared. Approximately 1 ml of each solution was placed onto the gelled PVC layer containing azodicarbonamide and ZnO. The ethanol was allowed to evaporate at room temperature followed by heat treatment at 400° F. for about 2 minutes. The TT100 inhibited the expansion of the gelled PVC layer in the area immediately underneath the TT100. The Z6020 and Z6030, however, did not appear to inhibit the expansion of the PVC layer.

In a third experiment, un-hydrolyzed Z6020 and Z6030 were applied to the surface of the PVC plastisol containing azodicarbonamide and ZnO. The samples were heated to 400° F. for about 2 minutes. No inhibition of the plastisol expansion was observed for either of the un-hydrolyzed versions of Z6020 and Z6030.

According to the results of this Example, Z6020 and Z6030 would not be considered inhibitors under the Nairn test. The results of Example 1, however, show that Z6020 and Z6030 are inhibitors for the azodicarbonamide/ZnO blowing agent. Therefore, the methods of the present invention have proven that the Nairn test cannot identify all possible inhibitors by identifying inhibitors that fail the Nairn test.

EXAMPLE 3

Not all "known inhibitors" of the prior art perform their inhibition function through adsorption. For example, fumaric acid adsorbs onto the ZnO catalyst but when the ZnO powder is pre-treated with fumaric acid, no inhibition occurs. Furthermore, certain compounds such as pre-hydrolyzed organo-silanes (non-traditional inhibitors) can be made to inhibit decomposition of the azo compounds through adsorption and pre-treatment of ZnO powder thereby. From these findings, it is apparent that other compounds, many of which would be unrecognizable as blowing inhibitors to those skilled in the art, would also reduce the efficiency of the blowing catalysts when such compounds are adsorbed onto the blowing catalysts. Finally, not all traditional inhibitors reduce the efficiency of the blowing catalysts, which indicates that certain types of inhibition reactions do not occur solely by passivation of the surface of the catalyst. Accordingly, the choice of a suitable inhibiting adsorbent is not obvious when considering the compounds from the list of known inhibitors for chemical embossing.

Various embodiments of the present invention have been described. The descriptions are intended to be illustrative of the present invention. It will be apparent to one of skill in the art that modifications may be made to the invention as described without departing from the scope of the claims set out below. For example, it is to be understood that although the present invention has been described using the organo-silanes and azoles as exemplary blowing inhibitors, any other substance that may adsorb onto the blowing catalyst and inhibit catalytic activity thereof may be used as the blowing inhibitor of the present invention.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

What is claimed is:

1. A modifier for controlling decomposition of a blowing agent having a decomposition temperature comprising:
   a catalyst having an effective capability to reduce the blowing agent decomposition temperature; and
   an organo-silane adsorbed onto the catalyst, the organo-silane capable of inhibiting the effectiveness of the catalyst.

2. The modifier of claim 1, wherein the catalyst includes at least one metal oxide.

3. The modifier of claim 2, wherein the metal oxide is zinc oxide.

4. The modifier of claim 1, wherein the organo-silane has a structure:

$$R_1\text{---}Si\text{---}(OR_2)_3$$

wherein $R_1$ is a functionalized organic substituent and $R_2$ is an aliphatic residue.

5. The modifier of claim 4, wherein the functionalized organic substituent for $R_1$ is selected from a group consisting of an aliphatic group, an aromatic group, a polar group, a non-polar group, a vinyl group, an acrylic group, an amino group, a styryl-amino group, a mercapto group, a phenyl-amino group, and a mixture thereof.

6. The modifier of claim 4, wherein the aliphatic residue for at least one of $R_2$ is selected from a group consisting of a sec-butyl group, a n-butyl group, an iso-propyl group, a n-propyl group, an ethyl group, a pentyl group, a hexyl group, a heptyl group, an octyl group, a nonyl group, a decyl group, an isomer of one of the groups, a higher molecular weight residue of one of the groups, and mixtures thereof.

7. The modifier of claim 1, wherein at least a portion of the organo-silane is one of a hydrolized organo-silane and an oligomerized organo-silane.

8. The modifier of claim 1 wherein the organo-silane is n-octyltriethoxy silane.

* * * * *